United States Patent Office 3,143,535
Patented Aug. 4, 1964

3,143,535
2,3-DIBROMOHEXAHYDRO-4,7-METHANOINDAN-5-YL ACRYLATE AND METHACRYLATE AND POLYMERS THEREOF
Winston J. Jackson, Jr., John R. Caldwell, and Edward H. Hill, Kingsport, Tenn., assignors to Eastman Kodak Company, Rochester, N.Y., a corporation of New Jersey
No Drawing. Filed Dec. 31, 1962, Ser. No. 248,202
9 Claims. (Cl. 260—85.5)

This invention relates to 2,3-dibromohexahydro-4,7-methanoindan-5-yl acrylate and methacrylate, to resinous polymers thereof, and to means for preparing these compounds.

The new class of monomeric compounds of the invention is represented by the following general formula:

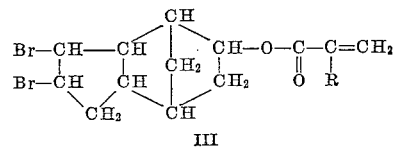

wherein R represents a hydrogen atom or a methyl group. They are useful for preparing various derivatives, and more especially useful for preparing resinous homopolymers and copolymers with one or more other monoethylenically unsaturated, polymerizable compounds, which polymers exhibit many desirable properties such as relatively high softening points, e.g., about from 115–230° C., high flame-resistance (many being self-extinguishing), toughness and good solubility in various common volatile solvents, for example, alkylene halides such as methylene chloride, ethylene chloride, etc., polyacrylonitrile solvents such as dimethylformamide, dimethylacetamide, γ-butyrolactone, ethylene carbonate, etc., and from which can be prepared excellent quality fibers for textile, films, rods and molding compositions giving shaped articles of exceptional thermal stability. The copolymers with acrylonitrile are particularly useful for fiber making purposes. The polymers are also capable of being hydrolyzed to alcohol derivatives, reesterified, acetalized, etc. to give modified polymers.

It is, accordingly, an object of the invention to provide a new class of unsaturated compounds that contain bromine and are self-extinguishing. Another object is to provide resinous homopolymers and copolymers thereof. Another object is to provide shaped articles from the new polymers that are characterized by having reduced flammability, relatively high softening points, toughness and good solubility in common volatile solvents. Another object is to provide methods for preparing the new monomers and polymers thereof. Other objects will become apparent hereinafter.

In accordance with the invention, we prepare our compounds represented by the above formula by the following reactions:

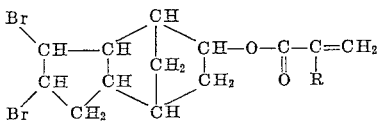

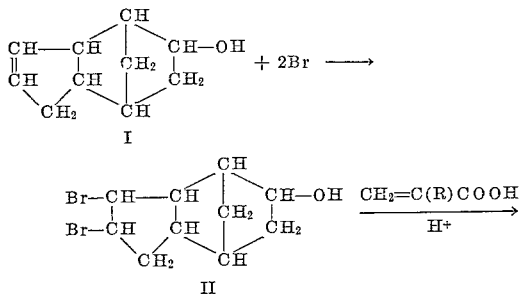

wherein R is as above defined. The starting material, 3a,4,5,6,7,7a-hexahydro-4,7-methanoinden-5-ol (I), is obtained by hydration of dicyclopentadiene. The dibromo alcohol (II) is obtained simply by bromination of the unsaturated alcohol (I), at 0–5° C. Advantageously, this reaction may be carried out in an inert solvent medium, for example, in carbon tetrachloride. Since a carbonyl band was not present in an infrared curve of the product, no oxidation of the hydroxy group had occurred. It is possible for rearrangements to occur during the bromination of bicyclic systems, but this was not the case here and the product by all tests was indicated as substantially the structure shown for above (II). The acrylate or methacrylate ester (III) is prepared by refluxing a mixture containing acrylic or methacrylic acid, the dibromo alcohol (II), benzene or other hydrocarbon solvent, acidic catalyst such as sulfuric acid, toluenesulfonic acid, and the like, and a polymerization inhibitor, for example, methylene blue or hydroquinone. The water which is formed in the esterification reaction is removed in the benzene azeotrope and collected in a Dean-Stark trap. A slight excess of the acrylic or methacrylic acid, i.e., greater than calculated for complete esterification, is employed to ensure completion of the reaction. Since the esters are high-boiling, they are not distilled. Purification can be effected, if desired, by extraction methods with a nonsolvent. However, they can be obtained pure enough as described above for direct use in the preparation of the resinous or high molecular weight polymers of the invention.

The polymerizations of the new monomeric compounds of the invention alone to form homopolymers or conjointly with one or more comonomers, i.e., other monoethylenically unsaturated, polymerizable compounds containing a —CH=C group, and more especially a CH$_2$=C group, to form resinous copolymers can be carried out in mass, in solution or in dispersion forms. Advantageously, a polymerization catalyst is employed. Heat or actinic light such as ultraviolet radiation also accelerate the polymerization reaction. Suitable catalysts include peroxides, e.g., benzoyl peroxide, acetyl peroxide, lauroyl peroxide, tertiary butyl hydroperoxide, hydrogen peroxide, etc., persulfates, e.g. sodium, potassium and ammonium persulfates, persulfuric acid, etc., perborates, e.g., sodium perborate, potassium perborate, etc., the water-soluble salts of percarbonic acid and perphosphoric acid, etc. Other useful polymerization catalysts are boron trifluoride and azo-bis-nitriles such as for example, azo-bis (isobutyronitrile). Mixtures of these catalysts can be used. The total amount of catalyst can vary widely, but preferably from about 0.1 to 3%, or even 5%, based on the weight of the monomers to be polymerized. The temperature can also vary widely, but the preferred range is from 30 to 120° C. Normal pressures, or pressures higher or lower than atmospheric may be used as desired. Advantageously, the reactions can be carried out under an inert atmosphere, e.g., under nitrogen. Suitable solvent media include water, lower alcohols, ketones, esters, aromatic or aliphatic hydrocarbons, glycol monoethers, e.g., ethanol, acetone, dioxane, methyl Cellosolve, etc.

For the emulsion or dispersion polymerizations any nonsolvent for the monomers and polymers can be employed, for example, lower alcohols, ketones and esters, aliphatic and aromatic hydrocarbons, glycol monoethers, and the like, represented by ethanol, acetone, dioxane, benzene, toluene, methyl Cellosolve, etc. However, water is an especially efficacious reaction medium. The monomers are finely dispersed therein using dispersing agents such as salts of higher fatty acids, e.g., sodium or potassium stearate, palmitate, etc., or ordinary soaps, salts of higher fatty alcohol sulfates, e.g., sodium or potassium dodecyl sulfate, sodium or potassium octadecyl sulfate, etc., sodium or potassium di(2-ethylhexyl)sulfosuccinate, sodium dodecyl benzene sulfonate, sulfonated mineral oils, etc. Mixtures of these dispersing agents can also be used. For the aqueous dispersion polymerizations, the most satisfactory catalysts include the sodium, potassium and ammonium persulfates, the corresponding perborates, hydrogen peroxide, and the like. Advantageously, an activating agent is added to the aqueous dispersions such as an alkali metal bisulfite, e.g., sodium or potassium bisulfite, in about the same amount as the catalyst. A chain regulator such as an alkyl mercaptan, e.g., hexyl, octyl, lauryl, dodecyl mercaptans, etc. can also be added with advantage to the aqueous system. Stirring, shaking or tumbling of the polymerization mixture during the polymerization gives improved product and yield. Where the reaction medium is an organic nonsolvent, catalysts that are soluble in the organic phase such as benzoyl peroxide, acetyl peroxide, tertiary butylhydroperoxide and azobis(isobutyronitrile) are employed. The polymeric products obtained by these procedures can be readily separated by conventional means for separating solids from liquid reaction mixtures, for example, by filtration, coagulation with ordinary salt followed by filtration, etc.

The copolymers of the invention prepared by the above described polymerization procedures can vary in any ratio of components, but preferably from 10–95% by weight of the monomeric compounds of the invention, and from 90–5% by weight of one or more other monoethylenically unsaturated, polymerizable compounds containing a —CH=C< group or more especially a $CH_2$=C< group. All of these copolymers are flame-resistant. Suitable unsaturated compounds of this latter kind include vinyl propionate, vinyl butyrate, vinyl trifluoroacetate, vinyl benzoate, etc., alkyl esters of acrylic and methacrylic acids such as methyl acrylate, ethyl acrylate, butyl acrylate, methyl methacrylate, etc., unsaturated nitriles such as acrylonitrile, methacrylonitrile, ethacrylonitrile, vinylidene cyanide, etc., vinyl hydrocarbons and derivatives such as styrene, α-methylstyrene, p-methylstyrene, p-acetaminostyrene, α-acetoxystyrene, ethylene, isobutylene, etc., halogen unsaturates such as vinyl chloride, vinyl fluoride, vinylidene chloride, vinylidene fluoride, tetrafluoroethylene, chlorotrifluoroethylene, etc., the amides, N-alkylamides and N,N-dialkylamides of acrylic and methacrylic acids, such as acrylamide, N-methyl acrylamide, N-isopropyl acrylamide, N,N-dimethylacrylamide, methacrylamide, N-butyl methacrylamide, etc., vinyl imides, N-vinyl lactams, vinyl pyrrolidones, vinyl pyridines, the esters, amides and ester-amides of maleic, fumaric, itaconic and citraconic acids, vinyl alkyl ketones, vinyl alkyl ethers, and the like. The compositions of the copolymers obtained have been found to be approximately the same as the mixture of monomers in the starting polymerization mixtures.

The following examples will serve to illustrate further the novel monomers of the invention, polymers thereof, and the manner of preparing the same.

*Example 1.—Preparation of 2,3-Dibromohexahydro-4,7-Methanoindan-5-Ol*

This compound was prepared by slowly adding while stirring 105 g. (0.66 mole) of bromine in 100 ml. of carbon tetrachloride to 100 g. (0.67 mole) of 3a,4,5,6,7,7a-hexahydro-4,7-methanoinden-5-ol (I) in 120 ml. of carbon tetrachloride. The temperature of the reaction mixture was maintained at 0–5° C. with an ice bath. The solution was stirred 20 min. longer, and then aqueous sodium bisulfite was added. The mixture was stirred until the trace of bromine still present, indicated by the orange color, had been destroyed. After the organic layer was washed with water 3 times, it was dried with sodium sulfate. The solvent was removed in a rotary evaporator at 40° C. under reduced pressure. Since the product turned dark brown, it was taken up in methylene chloride and treated with activated charcoal, which removed most of the color. After removal of the solvent as before, a viscous oil was obtained. It was not distilled because it was very high-boiling. An infrared curve was in agreement with structure (II).

*Analysis.*—Calcd. for $C_{10}H_{14}Br_2O$: C, 38.7; H, 4.5; Br, 51.7. Found: C, 39.0; H, 4.7; Br, 50.7 (all values percent by wt.).

*Example 2.—Preparation of 2,3-Dibromohexahydro-4,7-Methanoindan-5-Yl Acrylate*

A solution containing 62.g. (0.20 mole) of the dibromo alcohol from Example 1, 18 g. (0.25 mole) of acrylic acid, 200 ml. of benzene, 0.1 g. of methylene blue, and 2 g. of p-toluenesulfonic acid was refluxed, and the water which formed was collected in a Dean-Stark trap attached to the flask. After the theoretical amount (3.6 ml.) was obtained, the solution was cooled. It was stirred with activated clay (to remove the methylene blue and other color). The solution was then washed with sodium bicarbonate solution and with water, dried with sodium sulfate, and concentrated in a rotary evaporator at room temperature under reduced pressure. The residue consisted of a viscous oil.

*Analysis.*—Calcd. for $C_{13}H_{16}Br_2O_2$: C, 42.9; H, 4.4; Br, 44.0. Found: C, 43.1; H, 4.7; Br, 43.1 (all values percent by wt.). These results indicate that the product obtained was essentially the compound of structure (III).

*Example 3.—Preparation of 2,3-Dibromohexahydro-4,7-Methanoindan-5-Yl Methacrylate*

Using methacrylic acid instead of acrylic acid, the procedure of Example 2 was used in preparing the methacrylate represented by structure (III). The product was a viscous oil.

*Analysis.*—Calcd. for $C_{14}H_{18}Br_2O_2$: C, 44.5; H, 4.8; Br, 42.3. Found: C, 44.8; H, 4.6; Br, 41.5 (all values percent by wt.).

*Example 4.—Homopolymer of 2,3-Dibromohexahydro-4,7-Methanoindan-5-Yl Methacrylate*

The following materials were placed in a pressure bottle and tumbled at 50° C. for 24 hours:

20 g. 2,3-dibromohexahydro-4,7-methanoindan-5-yl acrylate
100 ml. water
0.2 g. ammonium persulfate
0.6 g. lauryl sulfate
0.1 g. sodium bisulfite The product was isolated as a powder which was washed with water and isopropyl alcohol and dried. It weighed 18.3 g. and was soluble in methylene chloride. Clear, hard films could be cast which had a hot-bar sticking point of 122° C. and which were self-extinguishing.

*Example 5.—Homopolymer of 2,3-Dibromohexahydro-4,7-Methanoindan-5-Yl Acrylate*

Using the same procedure as in Example 4, the homopolymer of 2,3-dibromohexahydro-4,7-methanoindan-5-yl methacrylate was prepared. Films of this polymer had a hot-bar sticking point of 136° C. and were self-extinguishing.

*Example 6.—Copolymer of 2,3-Dibromohexahydro-4,7-Methanoindan-5-Yl Acrylate and Acrylonitrile*

The following materials were placed in a pressure bottle and tumbled at 60° C. for 18 hours:

65 g. acrylonitrile
35 g. 2,3-dibromohexahydro-4,7-methanoindan-5-yl acrylate
500 ml. water
1.0 g. potassium persulfate
0.5 g. sodium bisulfite
4.0 g. sodium dodecyl benzene sulfonate The resulting white powder was filtered, washed with water and isopropyl alcohol, and dried. It weighed 92.4 g. and a bromine analysis showed that it cotnained 34.4% of the acrylate. The polymer was dissolved in dimethylformamide and dry-spun into fibers having the following properties:

2.0 g./den., with 16% elongation
Sticking point, 195–210° C.
Flow point, 121–220° C. at 0.2 g./den.
The fibers were self-extinguishing.

*Example 7.—Copolymer of 2,3-Dibromohexahydro-4,7-Methanoindan-5-Yl Methacrylate and Methyl Methacrylate*

The following materials were placed in a pressure bottle and tumbled at 50° C. for 24 hours:

30 g. 2,3-dibromohexahydro-4,7-methanoindan-5-yl methacrylate
20 g. methyl methacrylate
200 ml. tert-butyl alcohol
0.5 g. azobisisobutyronitrile The resulting polymer weighed 49 g. It was compression molded into buttons which had a heat distortion temperature of 118° C. at 66 p.s.i.

*Example 8.—Copolymer of 2,3-Dibromohexahydro-4,7-Methanoindan-5-Yl Methacrylate and Methyl Acrylate*

The following materials were placed in a flask equipped with a reflux condenser, sweep stirrer, and nitrogen inlet:

130 g. 2,3-dibromohexahydro-4,7-methanoindan-5-yl methacrylate
70 g. methyl acrylate
1000 ml. water
2.0 g. ammonium persulfate
1.0 g. sodium bisulfite
6.0 g. lauryl sulfate After stirring at 50° C. for 12 hours, the polymer was isolated by filtering and washed with water and methanol. After drying it weighed 193 g. It was injection molded into bars having the following physical properties:

Tensile strength, 9,600 p.s.i.
Elongation, 14%
Modulus, $3.4 \times 10^5$ p.s.i.
Heat distortion, 115–120° C. at 66 p.s.i.

*Example 9.—Copolymer of 2,3-Dibromohexahydro-4,7-Methanoindan-5-Yl Acrylate and Vinylidene Chloride*

Using the method of Example 7, a copolymer was prepared having the weight composition 54 parts vinylidene chloride–46 parts 2,3-dibromohexahydro-4,7-methanoindan-5-yl acrylate. Clear, tough, self-extinguishing films could be cast from it using methylene chloride as a solvent.

*Example 10.—Copolymer of 2,3-Dibromohexahydro-4,7-Methanoindan-5-Yl Acrylate and Vinyl Chloride*

Using the method of Example 6, a copolymer was prepared having the weight composition of 70% vinyl chloride–30% 2,3 - dibromohexahydro-4,7-methanindan-5-yl acrylate. Hard, tough buttons were molded from the polymer after incorporating 25% dioctyl phthalate as a plasticizer. These buttons were self-extinguishing.

*Example 11.—Copolymer of 2,3-Dibromohexahydro-4,7-Methanoindan-5-Yl Acrylate and Vinyl Acetate*

The following materials were tumbled in a pressure bottle at 60° C. for 20 hours:

14 g. 2,3-dibromohexahydro-4,7-methanoindan-5-yl acrylate
6 g. vinyl acetate
100 ml. butyl acetate
0.2 g. acetyl peroxide A clear, viscous dope was obtained from which tough, self-extinguishing films could be cast.

*Example 12.—Copolymer of 2,3-Dibromohexahydro-4,7-Methanoindan-5-Yl Methacrylate and n-Butyl Methacrylate*

Using the method of Example 11 a polymer was prepared having the weight composition of 82% 2,3-dibromohexahydro-4,7-methanoindan-5-yl methacrylate–18% n-butyl methacrylate. Films cast from the dope were self-extinguishing.

By proceeding as set forth in the above examples, other generally similar copolymers can be prepared by employing starting polymerizations mixtures containing 10%, 15%, 20%, 40%, 70%, etc. by weight of one or other of the monomers of the invention, the remainder of the monomers being one or more of the other mentioned monoethylenically unsaturated, polymerizable compounds. All of the polymers of the invention can be dissolved, as previously mentioned, in one or more volatile solvents and the solutions or dopes thus obtained can be extruded to form filaments and fibers as with the acrylonitrile containing copolymers, coated to continuous sheets, photographic film supports, etc. The molding compositions prepared with the polymers of the invention can be readily molded by injection and compression methods. All of the compositions whether designed for use in the form of their solutions or dopes, or in the form of molding materials can, if desired, have incorporated therein suitable fillers, dyes, pigments, plasticizers and the like materials.

The invention has been described in detail with particular reference to preferred embodiments thereof, but it will be understood that variations and modifications can be effected within the spirit and scope of the invention as described hereinabove and as defined in the appended claims.

What we claim is:

1. A compound having the general formula:

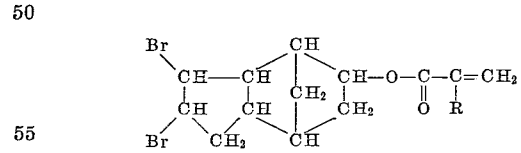

wherein R represents a member selected from the group consisting of a hydrogen atom and a methyl group.

2. 2,3-dibromohexahydro-4,7-methanoindan-5-yl acrylate.

3. 2,3-dibromohexahydro-4,7-methanoindan-5-yl methacrylate.

4. A polymer of a compound having the general formula:

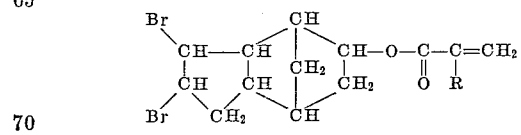

wherein R represents a member selected from the group consisting of a hydrogen atom and a methyl group.

5. A copolymer of 2,3-dibromohexahydro-4,7-methanoindan-5-yl acrylate and acrylonitrile.

6. A copolymer of 2,3-dibromohexahydro-4,7-methano-indan-5-yl methacrylate and methyl methacrylate.

7. A copolymer of 2,3-dibromohexahydro-4,7-methano-indan-5-yl methacrylate and methyl acrylate.

8. A copolymer of 2,3-dibromohexahydro-4,7-methano-indan-5-yl acrylate and vinyl chloride.

9. A copolymer of 2,3-dibromohexahydro-4,7-methano-indan-5-yl acrylate and vinyl acetate.

References Cited in the file of this patent

UNITED STATES PATENTS

| | | |
|---|---|---|
| 2,395,452 | Bruson | Feb. 26, 1946 |
| 2,414,089 | Bruson | Jan. 14, 1947 |
| 2,653,975 | Mowry et al. | Sept. 29, 1953 |
| 3,062,782 | Tapas et al. | Nov. 6, 1962 |